United States Patent [19]

Hashimoto et al.

[11] Patent Number: 5,155,151
[45] Date of Patent: Oct. 13, 1992

[54] HEAT STABLE THERMOPLASTIC RESIN COMPOSITION

[75] Inventors: Kenji Hashimoto; Syuzi Takahashi; Hiroyuki Minematsu, all of Niihama, Japan

[73] Assignee: Sumitomo Naugatuck Co., Ltd., Osaka, Japan

[21] Appl. No.: 837,605

[22] Filed: Feb. 21, 1992

Related U.S. Application Data

[63] Continuation of Ser. No. 320,819, Mar. 10, 1989, abandoned, which is a continuation of Ser. No. 107,463, Oct. 13, 1987, abandoned.

[30] Foreign Application Priority Data

Oct. 13, 1986 [JP] Japan ................. 61-242622
Oct. 27, 1986 [JP] Japan ................. 61-256440
Mar. 17, 1987 [JP] Japan ................. 62-63054

[51] Int. Cl.$^5$ .............................. C08K 5/35
[52] U.S. Cl. ..................... 524/95; 524/106; 524/191; 524/192; 524/193; 524/228; 524/229; 524/578
[58] Field of Search .......... 524/192, 193, 228, 577, 524/578, 229, 191, 106, 95

[56] References Cited

U.S. PATENT DOCUMENTS

| | | | |
|---|---|---|---|
| 3,683,020 | 8/1972 | Luethi et al. | 524/228 |
| 3,894,990 | 7/1975 | Müller et al. | 524/192 |
| 3,901,867 | 8/1975 | Beck | 524/228 |
| 3,960,787 | 6/1976 | Isukamoto | 521/56 |
| 4,014,853 | 3/1977 | Hartless et al. | 524/109 |
| 4,049,624 | 9/1977 | Anderson | 524/577 |
| 4,077,948 | 3/1978 | Cowell et al. | 524/193 |
| 4,221,905 | 9/1980 | Tokas | 524/577 |
| 4,663,375 | 5/1987 | Tamura et al. | 524/228 |
| 4,684,684 | 8/1987 | Abe et al. | 524/228 |

FOREIGN PATENT DOCUMENTS 2253092 12/1973 Fed. Rep. of Germany .
14262 1/1986 Japan ................. 524/228
2000512 1/1979 United Kingdom ................. 524/228

OTHER PUBLICATIONS

Database Chemical Abstracts 85:22323q (1986).
Patent Abstracts of Japan, vol. 8, No. 145 (C-232) [1582] Jul. 1984.
Chemical Abstracts 102:133000w (Oct. 1984).

Primary Examiner—John C. Bleutge
Assistant Examiner—Mark Sweet

[57] ABSTRACT

A thermoplastic resin composition having improved heat stability which comprises a thermoplastic resin which contains at least 5% by weight of an α-alkyl-substituted aromatic copolymer comprising α-alkyl-substituted aromatic vinyl compound and at least one other comonomer copolymerizable therewith, wherein the composition contains a metal-deactivating agent which has a molecular weight of not more than 2,000 and at least one group of the formula:

$$-\underset{\underset{O}{\|}}{C}-\underset{\underset{H}{|}}{N}- \quad \text{(I)}$$

or an organometallic colorant containing free metal in an amount of not more than 2,000 ppm, from which a molded article having no or less silver streaks can be produced.

2 Claims, No Drawings

HEAT STABLE THERMOPLASTIC RESIN COMPOSITION

This application is a continuation, of application Ser. No. 07/320,819, filed Mar. 10, 1989, now abandoned which is a continuation of application Ser. No. 07/107,463, field Oct. 13, 1987, now abandoned.

BACKGROUND OF THE INVENTION

1. Field of the Invention

The present invention relates to a heat stable thermoplastic resin composition. More particularly, it relates to a thermoplastic resin having improved heat stability which can be molded even at high temperatures to give a molded article having few or no silver streaks on the article.

2. Description of the Prior Art

It is known that α-methylstyrene base copolymer with good heat resistance is produced by replacing a part or the whole of styrene in a styrene base resin such as a styrene-acrylonitrile copolymer with α-methylstyrene and that blend of the α-methylstyrene base copolymer with other resin such as an ABS graft polymer provides a resin composition which has improved heat resistance. The α-methylstyrene base copolymer and the blend of said copolymer with the ABS graft polymer are in practical applications used. Such copolymer or blend may be colored by an inorganic or organic colorant.

As an α-methylstyrene content in the copolymer or the blend increases, heat resistance of the copolymer or blend is improved but its processability deteriorates. Therefore, he copolymer or the blend having the higher α-methylstyrene content should be processed at the higher temperature. But, at the higher processing temperature, silver streaks often appear on the surface of the molded article and do not disappear in subsequent fabrication steps such as coating. When the processing temperature is lowered to prevent the formation of silver streaks, processability is decreased and problems such as short molding are caused.

It is known that, in general, the silver streaks appear more frequently when the resin contains a larger amount of volatile components. To remove the volatile components, the resin is intensively dried before molding. Since the presence of volatile components in the resin is not the sole cause for the silver streaking and there may be some unknown causes, intensive drying of the resin does not necessarily prevent the formation of silver streaks. Addition of an antioxidant cannot prevent the formation of silver streaks either.

In some cases, a colorant is added to the α-methylstyrene base copolymer and its resin composition before or during molding as in the case of other thermoplastic resin. Particularly, the addition of an organo-metallic colorant causes the more frequent occurrence of the silver streaks than other colorants.

SUMMARY OF THE INVENTION

One object of the present invention is to provide a thermoplastic resin composition comprising an α-alkyl-substituted aromatic copolymer which has good heat stability.

Another object of the present invention is to provide a thermoplastic resin composition comprising an α-alkyl-substituted aromatic copolymer which gives a molded article having few or no silver streak on its surface.

A further object of the present invention is to provide an organometallic colorant which causes less silver streaks on a surface of a molded article of an α-alkyl-substituted aromatic copolymer.

According to one aspect of the present invention, there is provided a thermoplastic resin composition which comprises a thermoplastic resin which contains at least 5% by weight of an α-alkyl-substituted aromatic copolymer comprising α-alkyl-substituted aromatic vinyl compound and at least one other comonomer copolymerizable therewith, wherein the composition contains a metal-deactivating agent which has a molecular weight of not more than 2,000 and at least one group of the formula:

or an organometallic colorant containing free metal in an amount of not more than 2,000 ppm.

According to another aspect of the present invention, there is provided an organometallic colorant for a thermoplastic resin which contains at least 5% by weight of an α-alkyl-substituted aromatic copolymer comprising α-alkyl-substituted aromatic vinyl compound and at least one other comonomer copolymerizable therewith, which colorant contains free metal in an amount of not more than 2,000 ppm.

DETAILED DESCRIPTION OF THE INVENTION

Generally, the α-alkyl-substituted aromatic vinyl compound contained in the α-alkyl-substituted aromatic copolymer used in the present invention is represented by the formula:

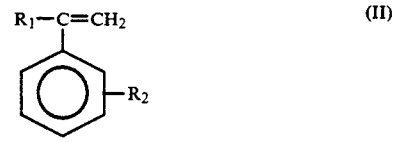

wherein $R_1$ is $C_1$-$C_3$ alkyl and $R_2$ is hydrogen, halogen or $C_1$-$C_3$ alkyl. Specific examples of the vinyl compound are α-methylstyrene, α-methyl-p-chlorostyrene, α-methyl-p-methyl-styrene and the like. These vinyl compounds may be used individually or as a mixture of two or more of them. In view of heat resistance and a properly balance for the copolymer, α-methylstyrene is preferred.

As other comonomer copolymerizable with the α-alkyl-substituted aromatic vinyl compound, exemplified are aromatic vinyl compounds, vinyl cyanide, unsaturated carboxylic acids and their alkyl esters or anhydrides, maleimide and its N-alkyl or N-aryl substituted derivatives, rubbery polymers and the like. These comonomers may be used individually or as a mixture of two or more of them.

Specific examples of the aromatic vinyl compounds except the α-alky-substituted one are styrene, p-methylstyrene, nuclear halogen-substituted styrene and mixtures thereof. Among them, styrene is preferred.

Specific examples of the vinyl cyanides are acrylonitrile, methacrylonitrile, maleonitrile, fumaronitrile and mixtures thereof. Among them, acrylonitrile is preferred.

Specific examples of the unsaturated carboxylic acids and their alkyl esters or anhydrides are acrylic acid, methacrylic acid, fumaric acid, itaconic acid, maleic acid, methyl (meth)acrylate, ethyl (meth)acrylate, propyl (meth)-acrylate, butyl (meth)acrylate and maleic anhydride. Among them, methyl methacrylate and maleic anhydride are preferred.

Specific examples of maleimide and its N-alkyl or N-aryl substituted derivatives are maleimide, methyl maleimide, ethylmaleimide. Among, them, N-phenylmaleimide is preferred.

Specific examples of the rubbery polymer are polybutadiene, butadiene-styrene copolymer, butadiene-acrylonitrile copolymer, ethylene-propylene copolymer, ethylene-propyrene-non-conjugated diene copolymer, polybutyl acrylate, ethylene-vinyl acetate copolymer and chlorinated polyethylene.

The ratio of the α-alkyl substituted aromatic vinyl compound and other comonomer in the α-alkyl-substituted aromatic copolymer is not limited. In view of the heat resistance and the property balance of the composition, a preferred content of the α-alkyl-substituted aromatic vinyl compound is from 5 to 90% by weight and that of other comonomer is from 95 to 10% by weight.

Among other comonomers, styrene, acrylonitrile, methyl methacrylate, maleic anhydride, methacrylic acid, N-phenylmaleimide and polybutadiene are preferred.

Specific examples of the α-alkyl-substituted aromatic copolymer are α-methylstyrene-acrylonitrile copolymer, α-methylsytrene-methyl methacrylate-(acrylonitrile or styrene) copolymer, α-methylstyrene-maleic anhydride-(acrylonitrile or styrene) copolymer, α-methylstyrene-N-phenylmale-imide-(acrylonitrile or styrene) copolymer, α-methylstyrene-polybutadiene-(acrylonitrile or styrene) copolymer and the like.

There is no limitation on the structure of the α-alkyl-substituted aromatic copolymer. In view of the formation of silver streaks, heat resistance and processability of the composition, the copolymer preferably has an intrinsic viscosity of 0.3 to 1.0 (at 30° C. in dimethylformamide).

The α-alkyl-substituted aromatic copolymer may be prepared by any of conventional polymerization methods suitable for polymerization of the α-alkyl-substituted aromatic vinyl compound, for example, emulsion polymerization, suspension polymerization, solution polymerization, bulk polymerization and combinations thereof.

Examples of other polymers which may be present in the thermoplastic resin composition of the present invention are a polymer comprising at least one monomer of the above described monomers such as the aromatic vinyl compounds except the α-alkyl-substituted aromatic vinyl compound, vinyl cyanide, the unsaturated derivatives; and conventional resins such as polycarbonate, polyphenyleneoxide, polysulfone, polyester, polyamide, polyacetal and the like. These other polymers may be used individually or as a mixture of two or more polymers.

In view of the property balance of the resin composition, preferred other polymers are a copolymer of the aromatic vinyl compound with vinyl cyanide and/or the alkyl ester of unsaturated carboxylic acid, a graft polymer of the rubbery polymer with the aromatic vinyl compound, vinyl cyanide and/or the alkyl ester of unsaturated carboxylic acid, and a mixture of the former copolymer and the latter graft polymer. The amount of α-alkyl-substituted aromatic copolymer is preferably at least 5% by weight, more preferably from 5 to 95% by weight based on the whole weight of the thermoplastic resin.

According to one of the preferred embodiments of the present invention, the content of active free metal in the resin composition is reduced by the addition of the metal-deactivating agent which has the group (I).

The metal-deactivating agent includes the compounds represented by the following formulae:

(1)

(2)

(3)

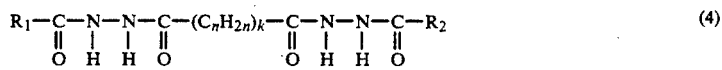

(4)

(5)

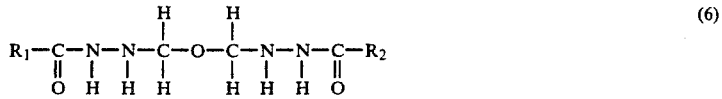

(6)

-continued

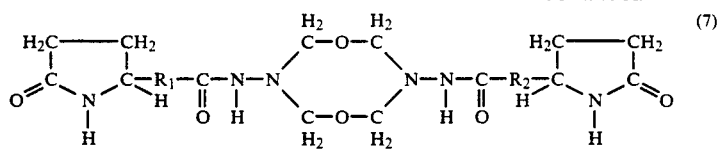         (7)

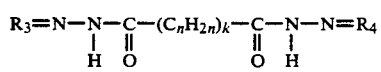         (8)

wherein $R_1$ and $R_2$ are the same or different and are hydrogen, $C_1$-$C_{20}$ alkyl, hydroxyl alkyl, aryl-substituted alkyl, hdroxyaryl-substituted alkyl, aryl, hydroxyaryl, alkyl-substituted aryl or alkyl-substituted hydroxyaryl; $R_3$ and $R_4$ are the same of different and are $C_1$-$C_{20}$ alkylene, hydroxyalkylene, aryl-substituted alkylene or hydroxyaryl-substituted alkylene; and k is a number ranging from 0 to 20.

Specific examples of the metal-deactivating agent are the following compounds:

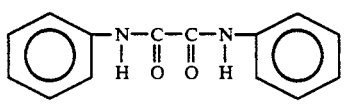         (i)

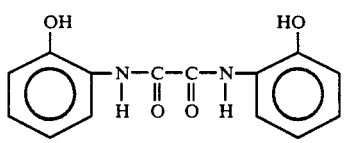         (ii)

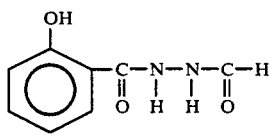         (iii)

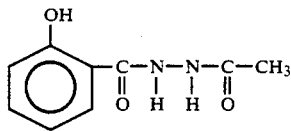         (iv)

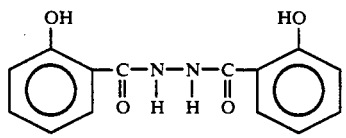         (iv)

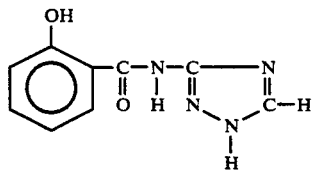         (vi)

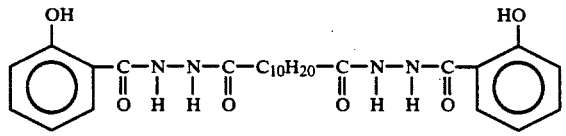         (vii)

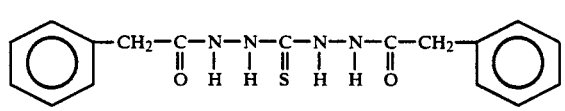         (viii)

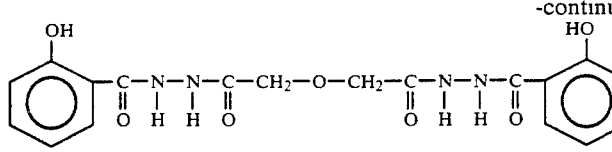
(ix)

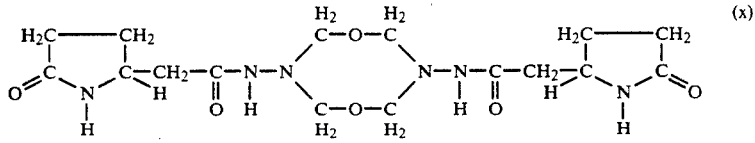
(x)

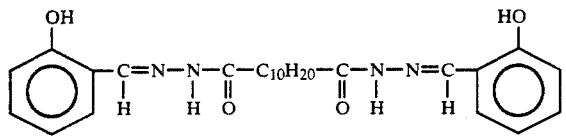
(xi)

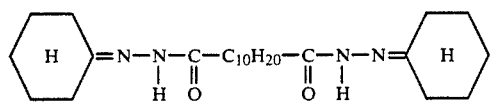
(xii)

When the metal-deactivating agent has a molecular weight larger than 2,000, its dispersibility in the resin is poor, so that the formation of silver streaks cannot be effectively suppressed.

The metal-deactivating agent of the present invention is used in an amount of 0.001 to 5.0 parts by weight, preferably 0.05 to 1.0 parts by weight per 100 parts of the thermoplastic resin. When the amount of the metal-deactivating agent is less than 0.001 parts by weight, the formation of silver streaks at high molding temperature is not prevented, and when it is more than 5.0 parts by weight, the final resin composition has decreased heat resistance and stiffness although the formation of silver streaks is prevented.

According to another preferred embodiment of the present invention, an organometallic colorant containing free metal in an amount of not more than 2,000 ppm is used as a colorant so as not to increase the amount of the free metal in the composition as much as does a conventional colorant.

Specific examples of such organometallic colorant are (i) Phthalocyanine containing Co, (ii) Lothol Red containing Ba, Ca, Na, Sr, Mn or Fe, (iii) Lake Red containing Ba or Al, (iv) Brilliant Carmine (Pigment Scarlet) containing Ba, Ni, Cu, Pb or Ca, (v) Alizarin Lake containing Ca, Ba, Al, Sr, Pb, Mg or Fe, (vi) Watchung Red (Permanent Red) containing Ca or Mn, (vii) Naphtol Green containing Ba or Fe, (viii) Acid Green Lake containing Ba, and mixtures thereof.

Significant improvement of suppression effect on silver streaks is achieved when Phthalocyanine type pigment containing copper which is thermally unstable and induces silver streaks is used according to the present invention.

When the amount of free metal in the dolorant exceeds 2,000 ppm, the silver streaks appear on the molded article of the thermoplastic resin composition. Preferably, the colorant contains the free metal in an amount of not more than 1,000 ppm.

When the colorant contains more than 2,000 ppm of free metal, it is thermally treated in sulfuric acid to reduce the content of free metal to 2,000 ppm or less. The content of free metal is determined by extracting the free metal elements from the colorant with an inorganic acid such as sulfuric acid and measuring the amount of free metal contained in the acid by atomic-absorption spectroscopy or colorimetry.

The ratio of the thermoplastic resin ad the organometallic colorant is not limited, and the resin composition can be colored in any color with adequate chroma, hue and color value by a suitable organometallic colorant. Alternatively, a resin composition containing a larger amount of the organometallic colorant than required is prepared as a color concentrate and, in use, it is mixed with an uncolored thermoplastic resin to obtain a composition having desired color.

Usually, the organometallic colorant is added in an amount of 0.01 to 20 parts by weight per 100 parts by weight of the thermoplastic resin. When the color concentrate is prepared, the colorant is added in an amount of 5 to 100 parts by weight per 100 parts by weight of the thermoplastic resin.

The amount of free metal introduced into the resin composition from the colorant is preferably not more than 100 ppm based on the total weight of the thermoplastic resin and the organometallic colorant. Preferably, the thermoplastic resin composition of the present invention comprises the thermoplastic resin and the organometallic colorant containing not more than 1,000 ppm of free metal, and the amount of free metal in the composition is not more than 50 ppm based on the total weight of the thermoplastic resin and the organometallic colorant.

The thermoplastic resin composition of the present invention may be prepared by any of the conventional mixing or kneading methods, for example, by using a Banbury mixer, a single or twin screw extruder, and the like.

In addition to the above essential components, the thermoplastic resin composition of the present invention may contain any of the conventional additives which are added to the thermoplastic resin. Examples of such additives are an inorganic colorant, an organic colorant, an inorganic filler, an antioxidant, a plasticizer, an antistatic agent, an ultraviolet light absorber, a flame retardant, a blowing agent, a lubricant and the like.

PREFERRED EMBODIMENTS OF THE INVENTION

The present invention will be illustrated by following Examples, which do not limit the present invention. In Examples, "parts" and "%" are by weight unless otherwise indicated.

EXAMPLE 1 AND COMPARATIVE EXAMPLE 1

Preparation of α-alkyl-substituted aromatic copolymer

In a reactor an interior space of which had been replaced with nitrogen, 30% of an monomer mixture (I) shown in Table 1 was added and reacted at 70° C. for 1 hour and then the rest of the monomer mixture (I) was continuously added over 3 hours to continue polymerization.

After exothermic heat due to polymerization was not generated any more, a monomer mixture (II) was continuously added over 1 hour at 70° C.

After the completion of polymerization, the reaction mixture was salted out, and the produce was dried to obtain an α-alkyl-substituted aromatic copolymer (a-1 to a-3).

TABLE 1

|  | Copolymer | | |
| --- | --- | --- | --- |
|  | a-1 | a-2 | a-3 |
| Monomer mixture (I) | | | |
| α-Methylstyrene | 70 | 80 | 30 |
| Acrylonitrile | 5 | 8 | 3 |
| t-Dodecylmercaptan | 0.05 | 0.05 | 0.05 |
| Sodium laryl sulfate | 2 | 2 | 2 |
| Potassium persulfate | 0.5 | 0.5 | 0.5 |
| Deionized water | 120 | 120 | 120 |
| Monomer mixture (II) | | | |
| α-Methylstyrene | 0 | 0 | 10 |
| Styrene | 0 | 0 | 10 |

TABLE 1-continued

|  | Copolymer | | |
| --- | --- | --- | --- |
|  | a-1 | a-2 | a-3 |
| Acrylonitrile | 25 | 12 | 27 |
| Methyl methacrylate | 0 | 0 | 10 |
| N-phenylmaleimide | 0 | 0 | 10 |
| Intrinsic viscosity | 0.60 | 0.48 | 0.55 |

Preparation of ABS graft polymer

In a reactor an interior space of which had been replaced with nitrogen, a composition shown in Table 2 was polymerized at 65° C. for 6 hours. The resulting polymer latex was salted out with potassium chloride and dried.

TABLE 2

| Component | Parts |
| --- | --- |
| Polybutadiene latex | 40 (solid components) |
| Styrene | 40 |
| Acrylonitrile | 20 |
| t-Dodecylmercaptan | 0.3 |
| Potassium persulfate | 0.3 |
| Disproportionated potassium rosinate | 2.0 |
| Water | Up to 150 |

AS copolymer

Styrene-acrylonitrile copolymer "Sebian N-JD" manufactured by Daicel Chemical Industries, Ltc. (acrylonitrile content, 27%; intrinsic viscosity, 0.62 in dimethlformaide at 30° C.).

Polycarbonate

Polycarbonate "Panlite 1-1250" Teijin Chemical Co., Ltd. (poly.-4,4'-dioxydiphenyl-2,2-propane carbonate).

Metal-deactivating agent

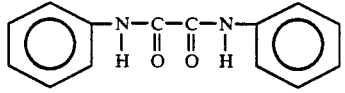
(B-1)

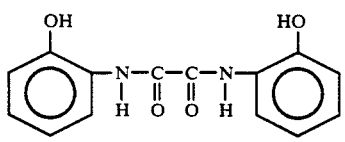
(B-2)

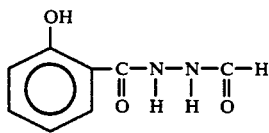
(B-3)

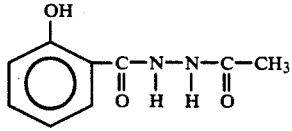
(B-4)

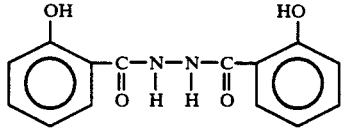
(B-5)

-continued

Metal-deactivating agent

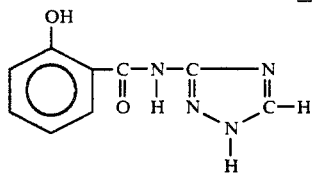 (B-6)

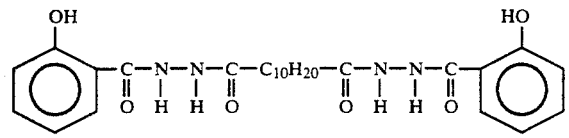 (B-7)

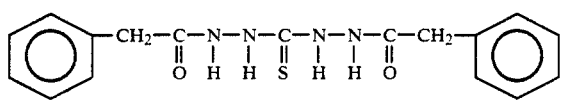 (B-8)

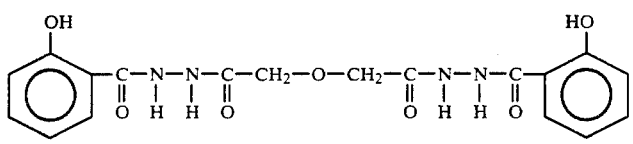 (B-9)

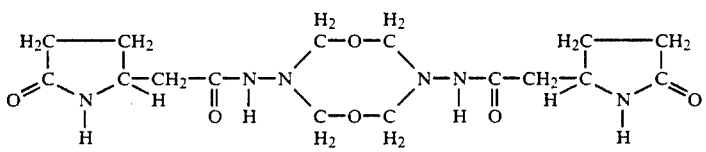 (B-10)

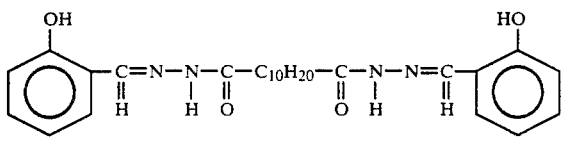 (B-11)

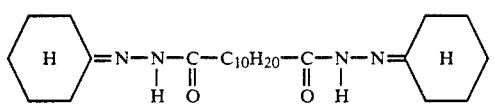 (B-12)

Colorant

Phthalocyanine Blue "Sumitone Cyanine Blue GH" manufactured by Sumitomo Chemical Company, Ltd, which contains 2,850 ppm of free metal.

Antioxidant (a) n-Octadecyl-3-(4 '-hydroxy-3', 5'-di-tert-butyl-phenyl) propionate "Irganox 1076" manufactured by Ciba-Geigy (Japan) Limited.

(b) 1,3,5-Trimethyl-2,4,6-tris-(3.5-d-tert-butyl-4-hydroxybenzyl)benzene "Irganox 1330" manufactured by Ciba-Geigy (Japan) Limited.

(c) Phenyl-β-naphthylamine

The α-alkyl-substituted aromatic copolymer (a-1 to a-3), the ABS graft polymer, the AS copolymer, polycarbonate, the metal-deactivating agent (B-1 to B-12), the colorant and the antioxidant (1 to 3) were mixed by the Banbury mixer and then kneaded and pelletized by an extruder.

The pellets were dried at 110° C. for 4 hours and molded under the below described conditions to prepare six sample plates (from second to seventh shots) (each 150 mm × 70 mm × 3 mm). The formation of silver streaks was visually observed and evaluated according to the following criteria:

O: No silver streaks
X: Silver streaks formed
XX: A large number of silver streaks formed Molding conditions A 3.5 ounce injection molding machine FS-75 manufactured by Nissei Jushi.

Resin temperature: 280° C. (preset temp.: 270° C.) 290° C. (preset temp.: 280° C.)

Detention time; 3 or 10 minutes

Back pressure: 5 kg/cm²

Injection rate: 100 rpm

Mold temperature: 75° C.

Molding cycle: 8 sec. (injection)/15 sec. (cooling)/5 sec. (removing)

The composition of each thermoplastic resin composition and evaluation results or silver streaks are shown in Table 3.

A sample plate made from each of two thermoplastic resin compositions one of which contained no metal-deactivating agent and the other of which contained the metal-deactivating agent according to the present invention was examined on heat deflection temperature ($\frac{1}{4}''$, 264 psi, no annealing), processability (230° C., 60 kg/cm²) and notched Izod impact strength ($\frac{1}{4}''$, 23° C.). It was confirmed that there was no material difference between two compositions.

EXAMPLE 9

In this Example, the α-alkyl-substituted aromatic copolymer (a-1 to a-3) was prepared in the same manner

TABLE 3

| | Resin Composition No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| [Composition] | | | | | | | | | | | | | | | | |
| Thermoplastic resin (100 parts): | | | | | | | | | | | | | | | | |
| α-Alkyl-substituted aromatic copolymer (%) | a-1 20 | a-1 20 | a-1 60 | a-1 60 | a-1 60 | a-1 60 | a-1 60 | a-1 60 | a-1 60 | a-1 60 | a-1 60 | a-1 60 | a-1 60 | a-1 60 | a-1 60 | a-1 60 |
| ABS graft polymer (%) | 60 | 60 | 40 | 40 | 40 | 40 | 40 | 40 | 40 | 40 | 40 | 40 | 40 | 40 | 40 | 40 |
| AS copolymer (%) | 20 | 20 | — | — | — | — | — | — | — | — | — | — | — | — | — | — |
| Polycarbonate (%) | — | — | — | — | — | — | — | — | — | — | — | — | — | — | — | — |
| Metal deactivating agent (parts) | — | B-1 0.1 | — | — | B-2 0.2 | B-3 0.3 | B-3 0.1 B-4 0.2 | B-5 0.5 | B-6 1.0 | B-7 0.3 | B-8 0.5 | B-9 0.1 | B-10 0.5 | B-11 0.8 | B-12 0.1 | — |
| Colorant (parts) | — | — | — | 0.5 | 0.5 | 0.5 | 0.5 | 0.5 | 0.5 | 0.5 | 0.5 | 0.5 | 0.5 | 0.5 | 0.5 | 0.5 |
| Antioxidant (parts) | — | — | — | — | — | — | — | — | — | — | — | — | — | — | — | a 0.5 |
| [Silver streaks] | | | | | | | | | | | | | | | | |
| 3 min detention at 280° C. | X | 0 | X | XX | 0 | 0 | 0 | 0 | 0 | 0 | 0 | 0 | 0 | 0 | 0 | XX |
| 3 min detention at 290° C. | X | 0 | X | XX | 0 | 0 | 0 | 0 | 0 | 0 | 0 | 0 | 0 | 0 | 0 | XX |
| 10 min detention at 290° C. | X | 0 | XX | XX | 0 | 0 | 0 | 0 | 0 | 0 | 0 | 0 | 0 | 0 | 0 | XX |

| | Resin Composition No. | | | | | | | | | | | | | |
|---|---|---|---|---|---|---|---|---|---|---|---|---|---|---|
| | 17 | 18 | 19 | 20 | 21 | 22 | 23 | 24 | 25 | 26 | 27 | 28 | 29 | 30 |
| [Composition] | | | | | | | | | | | | | | |
| Thermoplastic resin (100 parts): | | | | | | | | | | | | | | |
| α-Alkyl-substituted aromatic copolymer (%) | a-1 60 | a-2 80 | a-2 80 | a-2 80 | a-2 80 | a-2 80 | a-3 50 | a-3 50 | a-3 50 | a-3 50 | a-1 25 | a-1 25 | a-1 25 | — |
| ABS graft polymer (%) | 40 | 20 | 20 | 20 | 20 | 20 | 40 | 40 | 40 | 40 | 25 | 25 | 25 | 40 |
| AS copolymer (%) | — | — | — | — | — | — | 10 | 10 | 10 | 10 | — | — | — | 60 |
| Polycarbonate (%) | — | — | — | — | — | — | — | — | — | — | 50 | 50 | 50 | — |
| Metal deactivating agent (parts) | — | — | — | B-1 0.3 | B-3 0.3 | B-2 0.2 B-4 0.1 | — | B-2 0.05 B-11 0.05 | B-9 0.1 | — | — | B-5 0.3 | B-2 0.05 B-6 0.15 | — |
| Colorant (parts) | 0.5 | — | 0.3 | 0.3 | 0.3 | 0.3 | 0.5 | 0.5 | 0.5 | 0.5 | 0.3 | 0.3 | 0.3 | 0.5 |
| Antioxidant (parts) | b 0.5 | — | — | — | — | — | — | — | — | c 0.5 | — | — | — | — |
| [Silver streaks] | | | | | | | | | | | | | | |
| 3 min detention at 280° C. | XX | X | XX | 0 | 0 | 0 | X | 0 | 0 | X | X | 0 | 0 | 0 |
| 3 min detention at 290° C. | XX | X | XX | 0 | 0 | 0 | X | 0 | 0 | X | X | 0 | 0 | 0 |
| 10 min detention at 290° C. | XX | XX | XX | 0 | 0 | 0 | XX | 0 | 0 | XX | XX | 0 | 0 | 0 |

EXAMPLES 2-5 AND COMPARATIVE EXAMPLES 2-3

Preparation of organometallic colorant of the present invention

A commercially available copper Phthalocyanine Blue containing 2,850 ppm of free copper elements (Comparative Example 2) was heated in sulfuric acid under such conditions that the treated Phthalocyanine contained 53 ppm (Example 2), 470 ppm (Example 3), 930 ppm (Example 4), 1,850 ppm (Example 5) or 2,150 ppm (Comparative Example 3) to obtain respective colorant.

EXAMPLES 6-8 AND COMPARATIVE EXAMPLES 4-5

A commercially available copper Phthalocyanine Green containing 3,130 ppm of free copper elements (Comparative Example 4) was heated in sulfuric acid under such conditions that the treated Phthalocyanine contained 170 ppm (Example 6), 850 ppm (Example 7), 1,730 ppm (Example 8) or 2,230 ppm (Comparative Example 5) to obtain respective colorant.

as in Example 1, and the ABS graft polymer was prepared in the same manner as in Example 1 but adding 0.5 part of 4,4'-butylidene-bis-(6-tert.-butyl-3-methylphenol) and 0.3 part of dilauryl 3,3'-thiodipropionate to 100 parts of the polymer latex. The AS copolymer, polycarbonate and the antioxidant were the same as used in Example 1.

As the colorant, the colorant prepared in Examples 2-8 or Comparative Examples 2-5 was used and no metal-deactivating agent was used.

Composition Nos. 1-17

100 Parts of the thermoplastic resin mixture (70% of α-alkyl-substituted aromatic copolymer and 30% of the ABS graft polymer) and 2.5 or 6 parts of the organometallic colorant and 1 part of the antioxidant (a, b or c) in Composition Nos. 13, 15, 16 and 17, the antioxidant was used.) were mixed by the Banbury mixer and kneaded and extruded by an extruder to produce colored pellets.

After the pellets were dried at 110° C. for 4 hours, they were molded under the same conditions as in Example 1 to prepare four sample plates (from second to fifth shots) (each 90 mm × 40 mm × 3 mm). The formation of silver streaks was visually observed and evaluated according to the following criteria:

O: No silver streak
Δ: Silver streaks formed slightly
X: Silver streaks formed
XX: A large number of silver streaks formed The composition of the colored resin composition and the evaluation results are shown in Table 4.

A sample plate made from each of two colored thermoplastic resin compositions one of which contained the commercially available organometallic colorant containing more than 2,000 ppm of free metal and the other of which contained the organometallic colorant according to the present invention containing 2,000 ppm or less of free metal was examined on heat deflection temperature (¼", 264 psi, no annealing), processability (230° C., 60 kg/cm²) and notched Izod impact strength (¼", 23° C.). It was confirmed that there was no material difference between two compositions.

TABLE 5

| Composition No. | Organometallic colorant | | | Free metal*¹ (Resin + Colorant) (ppm) | Silver streaks | | |
|---|---|---|---|---|---|---|---|
| | Kind | Parts | Free metal (ppm) | | 280° C. × 3 min | 290° C. × 3 min | 290° C. × 10 min |
| 18 | C. Ex. 2 | 5 | 2,850 | 135.7 | XX | XX | XX |
| 19 | Ex. 2 | 5 | 53 | 2.5 | 0 | 0 | 0 |
| 20 | Ex. 3 | 5 | 470 | 22.4 | 0 | 0 | 0 |
| 21 | Ex. 4 | 5 | 930 | 44.3 | 0 | 0 | 0 |
| 22 | Ex. 5 | 5 | 1,850 | 88.1 | 0 | 0 | Δ |
| 23 | C. Ex. 3 | 5 | 2,150 | 102.4 | XX | XX | XX |

Note: *¹Free metal introduced by the colorant.

containing more than 2,000 ppm of free metal and the other of which contained the organometallic colorant according to the present invention containing 2,000 ppm or less of free metal was examined on heat deflection temperature (¼", 264 psi, no annealing), processability (230° C., 60 kg/cm²) and notched Izod impact strength (¼", 23° C.). It was confirmed that the was no material difference between two compositions.

Composition Nos. 24–33

100 Parts of the thermoplastic resin mixture (20% of α-alkyl-substituted aromatic copolymer (a-3), 30% of the ABS graft polymer and 50% of polycarbonate) and 1.5 or 6 parts of the organometallic colorant and 1 part of the anti-oxidant were mixed by the Banbury mixer and kneaded and extruded by an extruder to produce

TABLE 4

| Composition No. | α-Alkyl-substituted aromatic polymer | Organometallic colorant | | | Free metal*⁴ (Resin + Colorant) (ppm) | Silver streaks | | |
|---|---|---|---|---|---|---|---|---|
| | | Kind | Parts | Free metal (ppm) | | 280° C. × 3 min | 290° C. × 3 min | 290° C. × 10 min |
| 1 | a-1 | C. Ex. 2 | 2.5 | 2,850 | 69.5 | XX | XX | XX |
| 2 | a-1 | Ex. 2 | 2.5 | 53 | 1.3 | 0 | 0 | 0 |
| 3 | a-1 | Ex. 3 | 2.5 | 470 | 11.5 | 0 | 0 | 0 |
| 4 | a-1 | Ex. 4 | 2.5 | 930 | 22.7 | 0 | 0 | 0 |
| 5 | a-1 | Ex. 5 | 2.5 | 1,850 | 45.1 | 0 | 0 | Δ |
| 6 | a-1 | C. Ex. 3 | 2.5 | 2,150 | 52.4 | X | XX | XX |
| 7 | a-2 | C. Ex. 4 | 6 | 2,850 | 161.3 | XX | XX | XX |
| 8 | a-2 | Ex. 2 | 6 | 53 | 3.0 | 0 | 0 | 0 |
| 9 | a-2 | Ex. 3 | 6 | 470 | 26.6 | 0 | 0 | 0 |
| 10 | a-2 | Ex. 4 | 6 | 930 | 52.6 | 0 | 0 | Δ |
| 11 | a-2 | Ex. 5 | 6 | 1,850 | 104.7 | 0 | Δ | Δ |
| 12 | a-2 | C. Ex. 3 | 6 | 2,150 | 121.7 | XX | XX | XX |
| 13*¹ | a-3 | Ex. 6 | 6 | 53 | 3.0 | 0 | 0 | 0 |
| 14 | a-3 | C. Ex. 3 | 6 | 2,150 | 121.7 | XX | XX | XX |
| 15*¹ | a-3 | C. Ex. 3 | 6 | 2,150 | 121.7 | XX | XX | XX |
| 16*² | a-3 | C. Ex. 3 | 6 | 2,150 | 121.7 | XX | XX | XX |
| 17*³ | a-3 | C. Ex. 3 | 6 | 2,150 | 121.7 | XX | XX | XX |

Note:
*¹Containing Antioxidant (a).
*²Containing Antioxidant (b).
*³Containing Antioxidant (c).
*⁴Free metal introduced by the colorant.

Composition Nos. 18–23

100 Parts of the thermoplastic resin mixture (40% of α-alkyl-substituted aromatic copolymer (a-1), 35% of the ABS graft polymer and 25 parts of the AS copolymer) and 5 parts of the organometallic colorant and 1 part of the anti-oxidant were mixed by the Banbury mixer and kneaded and extruded by an extruder to produce colored pellets.

The sample plates were produced in the same manner as above and evaluated with respect to the formation of silver streaks in the same way as above. The composition and the evaluation results are shown in Table 5.

colored pellets.

The sample plates were produced in the same manner as above and evaluated with respect to the formation of silver streaks in the same way as above. The composition and the evaluation results are shown in Table 6.

A sample plate from each of two colored thermoplastic resin compositions one of which contained the commercially available organometallic colorant containing more than 2,000 ppm of free metal and the other of which contained the organometallic colorant according to the present invention containing 2,000 ppm or less of real metal was examined on heat deflection temperature (¼", 264 psi, no annealing), processability (230° C., 60 kg/cm²) and notched Izod impact strength (¼",23° C.),. It was confirmed that there was no material difference between two compositions.

TABLE 6

| Composition No. | Organometallic colorant | | Free metal (ppm) | Free metal*¹ (Resin + Colorant) (ppm) | Silver streaks | | |
|---|---|---|---|---|---|---|---|
| | Kind | Parts | | | 280° C. × 3 min | 290° C. × 3 min | 290° C. × 10 min |
| 24 | C. Ex. 4 | 1.5 | 3,130 | 46.3 | X | X | XX |
| 25 | Ex. 6 | 1.5 | 170 | 2.5 | 0 | 0 | 0 |
| 26 | Ex. 7 | 1.5 | 850 | 12.6 | 0 | 0 | 0 |
| 27 | Ex. 8 | 1.5 | 1,930 | 28.5 | 0 | 0 | Δ |
| 28 | C. Ex. 5 | 1.5 | 2,230 | 33.0 | X | X | XX |
| 29 | C. Ex. 4 | 6 | 3,130 | 177.2 | X | X | XX |
| 30 | Ex. 6 | 6 | 170 | 9.6 | 0 | 0 | 0 |
| 31 | Ex. 7 | 6 | 850 | 48.1 | 0 | 0 | 0 |
| 32 | Ex. 8 | 6 | 1,930 | 109.2 | 0 | Δ | Δ |
| 33 | C. Ex. 5 | 6 | 2,230 | 126.2 | X | X | XX |

Note: *¹Free metal introduced by the colorant.

Composition Nos. 34–36

100 Parts of the thermoplastic resin mixture (70% of α-alkyl-substituted aromatic copolymer (a-3) and 30% of the ABS graft polymer, 0.3 part of titanium oxide, 0.2 part of carbon black, 0.3 part of iron oxide red, 0.2 part of perylene red, 2.0 parts of the organometallic colorant (Comparative Example 2 of Example 2 or 3), 0.5 part of ethylene-bisstearamide as a processing aid and 0.5 part of calcium stearate were mixed by the Banbury mixer and kneaded and extruded by an extruder to produce colored pellets.

The sample plates were produced in the same manner as above and evaluated with respect to the formation of silver streaks in the same way as above. The composition and the evaluation results are shown in Table 7.

A sample plate made from each of two colored thermoplastic resin compositions one of which contained the commercially available organometallic colorant containing more than 2,000 ppm of free metal and the other of which contained the organometallic colorant according to the present invention containing 2,000 ppm or less of free metal was examined on heat deflection temperature (¼", 264 ps, no annealing), processability (230° C., 60 kg/cm²) and notched Izod impact strength (¼", 23° C.). It was confirmed that there was no material difference between two compositions.

dride of unsaturated carboxylic acid, maleimide, N-alkyl substituted derivative of maleimide and N-aryl substituted derivative of maleimide, and which comprises (ii) at least one other thermoplastic polymer selected from the group consisting of a copolymer of an aromatic vinyl compound different from the α-alkyl-substituted aromatic vinyl compound with at least one compound selected from the group consisting of vinyl cyanide and alkyl ester of unsaturated carboxylic acid, and a graft copolymer of a rubbery polymer with an aromatic vinyl compound different from the α-alkyl-substituted aromatic vinyl compound and at least one compound selected from the group consisting of vinyl cyanide and alkyl ester of unsaturated carboxylic acid, and (b) a metal-deactivating agent in an amount ranging from 0.001 to 5.0 parts by weight per 100 parts of the thermoplastic resin effective to reduce the formation of silver streaks on molding, said metal-deactivating agent having a molecular weight of not more than 2,000 and being at least one compound selected from the group consisting of the compounds of the formulae:

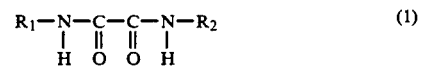   (1)

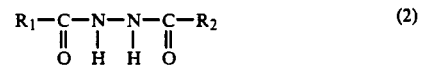   (2)

TABLE 7

| Composition No. | Organometallic colorant | | Free metal (ppm) | Free metal*¹ (Resin + Colorant) (ppm) | Silver streaks | | |
|---|---|---|---|---|---|---|---|
| | Kind | Parts | | | 280° C. × 3 min | 290° C. × 3 min | 290° C. × 10 min |
| 18 | C. Ex. 2 | 2 | 2,850 | 55.3 | X | X | XX |
| 19 | Ex. 2 | 2 | 53 | 1.0 | 0 | 0 | 0 |
| 20 | Ex. 3 | 2 | 470 | 9.1 | 0 | 0 | 0 |

Note: *¹Free metal introduced by the colorant.

What is claimed is:

1. A thermoplastic resin molding composition which comprises
   (a) a thermoplastic resin which contains (i) as the sole α-alkyl substituted copolymer in the composition at least 5% by weight of an α-alkyl-substituted aromatic copolymer comprising from 40% to 80% α-alkyl-substituted aromatic vinyl compound and as the only comonomer copolymerizable therewith at least one compound selected from the group consisting of aromatic vinyl compound different from the α-alkyl-substituted aromatic vinyl compound, vinyl cyanide, unsaturated carboxylic acid, alkylester of unsaturated carboxylic acid, anhy-

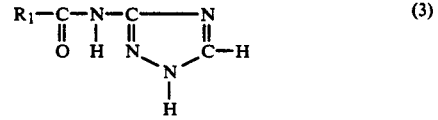   (3)

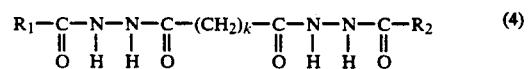   (4)

-continued $$R_1-\underset{\underset{O}{\|}}{C}-\underset{\underset{H}{|}}{N}-\underset{\underset{H}{|}}{N}-\underset{\underset{S}{\|}}{C}-\underset{\underset{H}{|}}{N}-\underset{\underset{H}{|}}{N}-\underset{\underset{O}{\|}}{C}-R_2 \qquad (5)$$

$$R_1-\underset{\underset{O}{\|}}{C}-\underset{\underset{H}{|}}{N}-\underset{\underset{H}{|}}{N}-\underset{\underset{H}{|}}{C}-O-\underset{\underset{H}{|}}{C}-\underset{\underset{H}{|}}{N}-\underset{\underset{H}{|}}{N}-\underset{\underset{O}{\|}}{C}-R_2 \qquad (6)$$

(7) [structure with pyrrolidinone and morpholine-like rings connected via $-R_1-C(=O)-N(H)-N-$ linkage]

-continued (8) [structure with pyrrolidinone ring connected to $-N(H)-C(=O)-R_2=C-$ and chain]

$$R_3=N-\underset{\underset{H}{|}}{N}-\underset{\underset{O}{\|}}{C}-(CH_2)_k-\underset{\underset{O}{\|}}{C}-\underset{\underset{H}{|}}{N}-N=R_4 \qquad (8)$$

wherein $R_1$ and $R_2$ are the same or different and are hydrogen, $C_1-C_{20}$ alkyl, hydroxyl alkyl, aryl-substituted alkyl, hydroxyaryl-substituted alkyl, aryl, hydroxyaryl, alkyl-substituted aryl or alkyl-substituted hydroxyaryl; $R_3$ and $R_4$ are the same or different and ar $C_1-C_{20}$ alkylene, hydroxyalkylene, aryl-substituted alkylene or hydroxyaryl-substituted alkylene; and k is a number ranging from 0 to 20.

2. The thermoplastic resin molding composition according to claim 1, wherein the thermoplastic resin comprises 5 to 95% by weight of α-alkyl-substituted aromatic copolymer and 95% to 5% by weight of said other thermoplastic polymer.

* * * * *